Nov. 2, 1948.        R. M. CONKLIN        2,452,733
                      WINDING MACHINE
Filed Oct. 8, 1946                          2 Sheets-Sheet 1

INVENTOR
R. M. CONKLIN
BY  W. C. Parnell
    ATTORNEY

Nov. 2, 1948.　　　R. M. CONKLIN　　　2,452,733
WINDING MACHINE
Filed Oct. 8, 1946　　　　　　　　　　　　　2 Sheets-Sheet 2
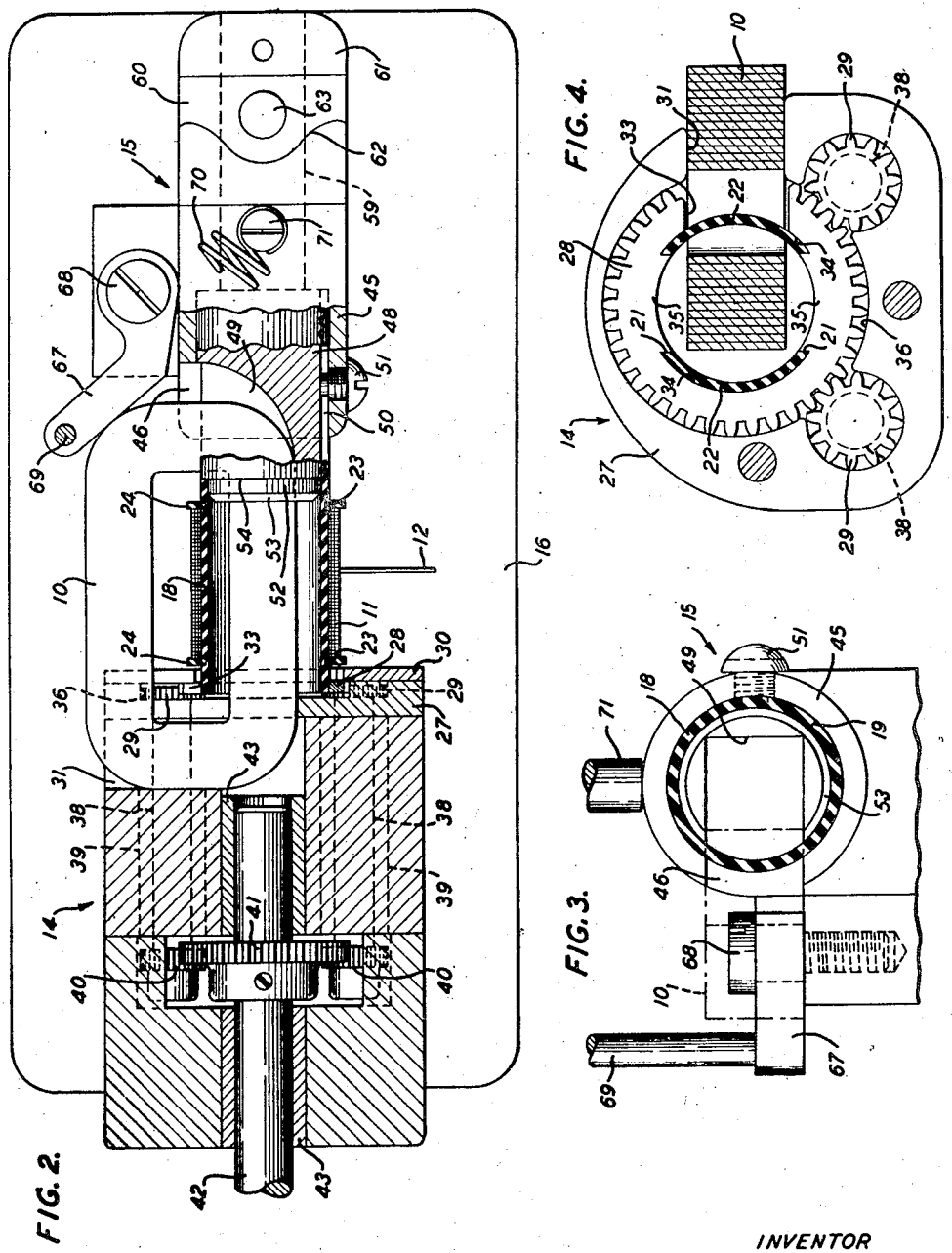
INVENTOR
R.M.CONKLIN
BY
W.C.Parnell
ATTORNEY Patented Nov. 2, 1948

2,452,733

UNITED STATES PATENT OFFICE 2,452,733

WINDING MACHINE

Robert M. Conklin, West Newbury, Mass., assignor to Western Electric Company, Incorporated, New York, N. Y., a corporation of New York Application October 8, 1946, Serial No. 701,871

7 Claims. (Cl. 242—4)

This invention relates to winding machines and more particularly to machines for winding coils on closed metallic cores.

In the manufacture of certain electrical units requiring coils formed of insulated electrical conductors disposed on cores of varied contours, the solution to the problem of winding the coils is simplified when the cores are formed of two or more parts assembled after the winding of the coil or coils on selected parts of the cores. However, as in the present instance, when the core is of the closed type formed of spirally wound convolutions of Permalloy tape and made into substantially rectangular form, the solution to the problem of winding a coil on a selected portion of the core is more difficult.

An object of the invention is to provide a winding machine which is simple in structure and highly efficient in winding a coil on a closed core. With this and other objects in view, the invention comprises a machine for winding a coil on a closed metallic core having a split tube with a notched end forced around one side of the core, the machine including a driving head with a gear having an open portion to receive the core and projections adjacent its inner periphery to interengage the notched end of the tube to form a driving connection with the tube. The driving means for the gear includes pinions driven in the same direction to rotate the gear continuously. The other end of the core and tube are supported by a member notched to partially receive and hold the core against rotation while the tube is allowed to rotate for the winding of a coil thereon. A releasable latch holds the core in position while actuating means are provided to move the notched member to free the core and tube when the coil is completed.

Other objects and advantages will be apparent from the following detailed description when considered in conjunction with the accompanying drawings, wherein Fig. 1 is a front elevational view of the winding machine, a portion thereof being shown in section;

Fig. 2 is a top plan view of the winding machine, portions thereof being shown in section;

Fig. 3 is an enlarged fragmentary sectional view taken along the line 3—3 of Fig. 1; and Fig. 4 is an enlarged fragmentary sectional view taken along the line 4—4 of Fig. 1.

Figure 1:
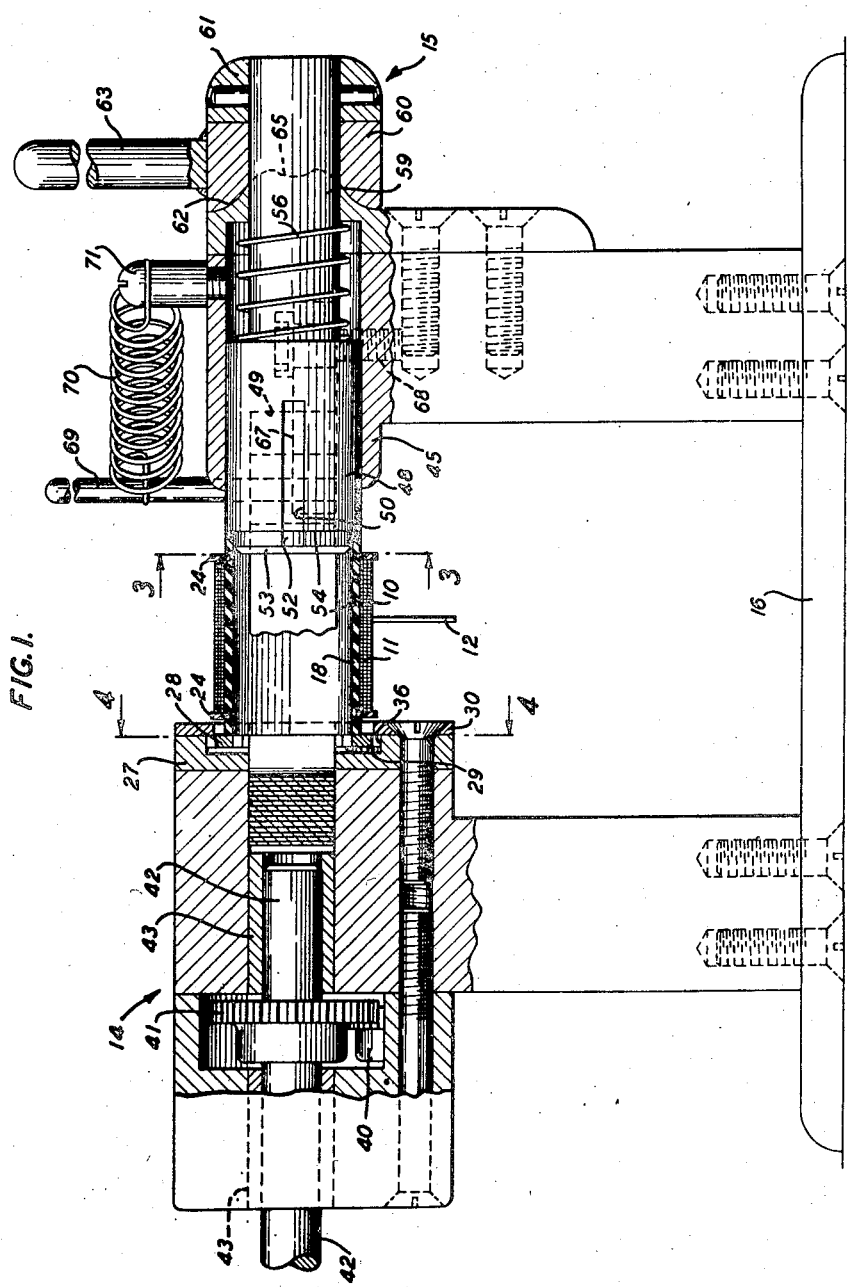

Referring now to the drawings, attention is first directed to the core 10 which is substantially rectangular in general contour and in the present instance, it is formed of a plurality of convolutions of spirally wound Permalloy tape. One or more coils 11 are to be wound on one side portion of the core, the coils to be formed of an insulated electrical conductor 12 received from a supply (not shown). The winding machine is composed mainly of two heads 14 and 15 mounted on a base 16 and disposed a given distance apart depending upon the size of the core and also the length of the coil to be wound thereon. The coil is to be wound upon a sleeve or tube 18 formed of a suitable fibrous insulating material, split longitudinally at one portion 19 throughout its length and being of a resilient nature whereby it may be sprung open and passed around one side of the core 10 and allowed to close thereon. One end of the sleeve 18 has diametrically opposed notches 21 therein providing intermediate projections 22. The sleeve 18 has annular grooves 23 in its outer periphery short of its ends to receive split rings 24 formed also of a suitable insulating material and being of sufficient resiliency to close when disposed in the recesses 23 to complete a spool for the winding of the coil or coils 11 thereon. The split rings 24 serve as heads for the spool, the sleeve being the main body of the spool.

The head 14 of the winding machine includes a recessed member 27 for partially housing a gear 28 (Fig. 4) and its driving pinions 29. The head 14 and the recessed member 27, as well as a cover plate 30 therefor, are recessed at 31 to receive the adjacent end of the core 10. The gear 28 may be termed an interrupted gear in that a portion is removed therefrom leaving an opening 33 to align with the recesses or cutaway portion 31 to receive the side of the core 10 upon which the coil is to be wound. The inner periphery of the gear 28 is recessed at 34 to receive the projections 22 of the sleeve, the recesses 34 of the gear providing projections 35 receivable in the notches or recesses 21 of the sleeve completing an interlocking connection between the gear and the sleeve 18. It will be noted that the gear 28 is supported in its recess 36 in the member 27 and is in interengagement with the pinions 29 at spaced positions about its periphery so that for the majority of time during the driving of the gear 28 both pinions will engage the gear and while the opening or cutaway portion 33 of the gear is adjacent one of the pinions, the gear continues to be driven by the other pinion.

The pinions 29 are mounted upon shafts 38 which are journalled in bearings 39 in the head 14. The ends of the shafts 38 opposite their pinions 29 support pinions 40 which interengage a drive gear 41. The drive gear 41 is mounted upon the drive shaft 42 supported in bearings 43 and driven by a suitable means (not shown). Through this arrangement the driving of the shaft and gear in a given direction will drive both pinions 40 to drive their shafts 38 and pinions 29 to drive the gear 28 and thus rotate the sleeve or spool on the core 10.

The head 15 constitutes means for supporting the other end of the core and the sleeve or spool 18 including also a clamp to lock the core against displacement. The upper portion of the head 15 includes a cylindrical member 45 cutaway at 46 to receive the core 10. A piston-like member 48 is movably disposed in the member 45 and is notched at 49 to receive the adjacent portion of the core 10. The member 48 has a longitudinal groove 50 to receive the inner end of a screw 51 serving to permit longitudinal movement of the member but hold it against rotation. The leading end 52 of the member 48 is reduced to be receivable in the sleeve or spool 18, and has a tapered edge 43. The reduced portion 52 provides a shoulder 54 to abut against the adjacent edge of the sleeve and with the aid of the force contributed by a spring 56 the sleeve is maintained at the desired position with respect to the selected side of the core and in interengagement with the gear 28. The spring 56 is disposed in the cylindrical member 45 concentric with a reduced portion 59 of the member 48 and normally urges the member to the left a distance limited by an actuating element 60. The element 60 is of the general contour shown in Figs. 1 and 2 disposed concentric with the reduced portion 59 and held thereon by collar 61. A cam-like member 62 which constitutes a part of the head 15 has high and low portions cooperating with the similarly curved high and low portions of the element 60 for causing reciprocable movement of the member 48 upon rocking motion of the element 60 through the aid of a handle 63. In the present illustration, the winding machine is shown in its closed or operating position with the leading end 52 of the member 48 disposed within and supporting its end of the sleeve 18. To position the head 15 in its open position, the element 60 is rocked until the high portions of the element come to rest in recesses 65 in the high portions of the cam members 62.

The clamping means of the head 15 includes an arm 67 pivotally supported at 68 and having a handle 69 at its free end for use in moving the arm between its clamping position, shown in Figs. 1 and 2, and its open position when moved clockwise about its pivot. A spring 70 having one end connected to the handle 69 and the other end to a threaded member 71 on the member 45 serves in firmly holding the arm 67 in either its clamping or open position. It will be apparent particularly by viewing Fig. 2 that when the arm is in the locking position the spring 70 causes it to engage the core 10 to hold the core firmly in its recesses or cutaway portions 31, 46 and 49. The spring 70 will also function to hold the arm out of clamping position when the handle 69 is moved clockwise whereby a plane intersecting the arm 69 and the member 71 will be upon the opposite side of the pivot 68.

Upon considering the operation of the winding machine, let it be assumed that the head 15 is in its open position, the arm 67 moved clockwise about its pivot and the member 48 at its farthest position to the right. At this time the machine is ready to receive a core 10 with a sleeve 18 and its heads 24. The sleeve and its heads are mounted upon the core externally of the machine and when located in the machine, the core is first disposed so that the left hand end thereof lies in the cutaway portion 31 of the head 14. At this time when the head 15 is in its open position, the cutaway portion 49 of the member 48 will be positioned so that it may assist in locating the core in place. The operator then moves the sleeve or spool until its projections 22 are receivable in the notches of the gear 28 and the projections 35 of the gear are disposed in the notches 21 of the sleeve. During this loading period, the gear 28 is positioned so that its cutaway portion 33 is in alignment with the cutaway portion 31 of the head 14. Suitable means (not shown) may be provided to stop the gear in this position or to rotate the shaft 42 until the gear is at the desired position. It should be understood that the gear 28 would be located with its cutaway portion in proper position for the removal of a core with its completed coil or coils, the gear 28 remaining in this position during the subsequent reloading of the machine.

After the core 10 has been located in the machine and the sleeve 18 positioned in interengagement with the gear 28, the handle 63 may be actuated to free the spring 56 for movement of the member 48 to the left for interengagement with the adjacent end of the sleeve. The locking arm 67 is then moved clockwise clamping the core in position. The machine is now ready for operation, assuming that the leading end of the wire 12 from which the coil is to be formed has been attached in a suitable manner to the sleeve 18. The shaft 42 is then driven to drive the pinions 40 simultaneously driving their shafts 38 and pinions 29 to drive the gear 28 and rotate the sleeve or spool 18. During the rotation of the spool the wire 12 is distributed thereon until the desired number of convolutions have been wound to complete the coil. If desired, a plurality of coils with intermediate layers of suitable insulating material may be formed on the sleeve or spool. Once the winding operation is completed, the arm 67 may be moved clockwise freeing the core 10 after which the member 48 may be moved to the right through rocking movement of the element 60, after which the core may be given a short movement to the right to disconnect the sleeve 18 from the gear 28 at which time the completed article is free to be removed from the machine.

Although specific improvements of the invention have been shown and described, it will be understood that they are but illustrative and that various modifications may be made therein without departing from the scope and spirit of this invention as defined by the appended claims.

What is claimed is:

1. A machine for winding a coil on a closed metallic core having a split tube forced around one side of the core and having a notched end, the machine comprising a driving head including a gear with an open portion to receive the core and projections adjacent its inner periphery to interengage the notched end of the tube to form a driving connection with the tube, and means to drive the gear to rotate the tube to wind a coil on the tube.

2. A machine for winding a coil on a closed metallic core having a split tube forced around one side of the core and having a notched end, the machine comprising a driving head including a gear with an open portion to receive the core and projections adjacent its inner periphery to interengage the notched end of the tube to form a driving connection with the tube, means notched to receive the core and formed to support the other end of the tube for rotation, and means to drive the gear to rotate the tube to wind a coil on the tube.

3. A machine for winding a coil on a closed metallic core having a split tube forced around one side of the core and having a notched end, the machine comprising a driving head notched to receive one end of the core, a gear, having an open portion to receive the said side of the core and projections adjacent its inner periphery to interengage the notched end of the tube to form a driving connection with the tube, rotatably supported in the head, an element notched to receive the core and formed to support the other end of the tube for rotation, and means to drive the gear to rotate the tube to wind a coil on the tube.

4. A machine for winding a coil on a closed metallic core having a split tube forced around one side of the core and having a notched end, the machine comprising a driving head including a gear with an open portion to receive the core and projections adjacent its inner periphery to interengage the notched end of the tube to form a driving connection with the tube, an element notched to receive the core and formed to support the other end of the tube for rotation, a latch to hold the core against displacement in the driving head and element, and means to drive the gear to rotate the tube to wind a coil on the tube.

5. A machine for winding a coil on a closed metallic core having a split tube forced around one side of the core and having a notched end, the machine comprising a driving head including a gear with an open portion to receive the core and projections adjacent its inner periphery to interengage the notched end of the tube to form a driving connection with the tube, spaced pinions mounted in the head for driving the gear to rotate the tube to wind a coil thereon, and means to drive the pinions simultaneously to continuously drive the gear.

6. A machine for winding a coil on a closed metallic core having a split tube forced around one side of the core and having a notched end, the machine comprising a driving head including a gear with an open portion to receive the core and projections adjacent its inner periphery to interengage the notched end of the tube to form a driving connection with the tube, an element notched to receive the core and formed to support the other end of the tube for rotation, means to force the element toward the tube to maintain the driving connection between the tube and the gear, and means to drive the gear to rotate the tube to wind a coil on the tube.

7. A machine for winding a coil on a closed metallic core having a split tube forced around one side of the core and having a notched end, the machine comprising a driving head including a gear with an open portion to receive the core and projections adjacent its inner periphery to interengage the notched end of the tube to form a driving connection with the tube, an element notched to receive the core and formed to support the other end of the tube for rotation, means to force the element toward the tube to maintain the driving connection between the tube and the gear, means to drive the gear to rotate the tube to wind a coil on the tube, and means operable to move the element away from the gear to free the tube.

ROBERT M. CONKLIN.

REFERENCES CITED

The following references are of record in the file of this patent:

UNITED STATES PATENTS

| Number | Name | Date |
|---|---|---|
| 2,305,999 | Steinmayer et al. | Dec. 22, 1942 |
| 2,334,131 | Schultz | Nov. 9, 1943 |
| 2,366,977 | Morrison | Jan. 9, 1945 |

FOREIGN PATENTS

| Number | Country | Date |
|---|---|---|
| 38,394 | Switzerland | Sept. 7, 1906 |